United States Patent [19]

Oshima et al.

[11] Patent Number: 4,934,427

[45] Date of Patent: Jun. 19, 1990

[54] PNEUMATIC TIRES

[75] Inventors: Kazuo Oshima, Higashiyamato; Shizuo Iwasaki, Kodaira, both of Japan

[73] Assignee: Bridgestone Corporation, Tokyo, Japan

[21] Appl. No.: 232,746

[22] Filed: Aug. 16, 1988

[30] Foreign Application Priority Data

Aug. 21, 1987 [JP] Japan ................... 62-206580

[51] Int. Cl.$^5$ ............ D02G 3/48; B60C 9/02; B60C 9/26
[52] U.S. Cl. .................... 152/451; 57/902; 152/527; 152/556
[58] Field of Search ............. 152/451, 527, 548, 556, 152/528, 529; 264/185, 205, 210.8; 428/364; 57/902

[56] References Cited

U.S. PATENT DOCUMENTS

| | | | |
|---|---|---|---|
| 4,698,194 | 10/1987 | Tanaka et al. | 264/185 |
| 4,765,937 | 8/1988 | Hyon et al. | 264/185 |
| 4,793,131 | 12/1988 | Mizuno et al. | 152/451 X |

FOREIGN PATENT DOCUMENTS

| | | |
|---|---|---|
| 0105169 | 4/1984 | European Pat. Off. . |
| 0146084 | 6/1985 | European Pat. Off. . |
| 0225391 | 6/1987 | European Pat. Off. . |
| 1579733 | 8/1969 | France . |
| 62-105704 | 5/1987 | Japan . |
| 62-146702 | 6/1987 | Japan . |
| 62-282015 | 12/1987 | Japan . |
| 8607393 | 12/1985 | PCT Int'l Appl. . |

OTHER PUBLICATIONS

Patent Abstract of Japan, vol. 10, No. 292, 61-108713, 5/27/86.

*Primary Examiner*—Raymond Hoch
*Attorney, Agent, or Firm*—Sughrue, Mion, Zinn, Macpeak & Seas

[57] ABSTRACT

A pneumatic tire is reinforced with cords made of polyvinyl alcohol based fibers, and meets the following requirements:

(1) A tenacity, S (g/d) of the cords taken out from the tire meets a relation: $S \geq 14.5 - 12N_T$ in which $N_T$ is a coefficient of twist, which is represented by $N_T = N \times \sqrt{0.139 \times D/\rho} \times 10^{-3}$. N, D and $\rho$ are a number of twist (turns/10 cm), a half of a total denier of the cords, and a specific density of the cords, respectively.

(2) A tenacity-retaining percentage of the cords in an absolutely dried state is not less than 90% of that before the treatment with boiling water. The absolutely dried state means that after the cord is treated with boiling water at 120° C. while being maintained at a constant length, the cord is dried.

1 Claim, 2 Drawing Sheets

PNEUMATIC TIRES

BACKGROUND OF THE INVENTION

(1) Field of the Invention

The present invention relates to pneumatic tires having improved fatigue resistance of cords used.

(2) Related Art Statement

Heretofore, polyvinyl alcohol based synthetic fibers (hereinafter referred to briefly as "PVA fibers") have widely been used for industrial fibers as rubber reinforcement. However, the PVA fibers have poor fatigue resistance, and are essentially soluble in water. Due to such polymer characteristics, the PVA fibers have inferior hot water resistance. Therefore, it is the current circumstances that as tire-reinforcing cords undergo of frequent applications of bent strains, the PVA fibers are merely used as a part of belt materials in radial tires, which belt materials undergo relatively smaller input strain.

However, as described in Japanese patent application Laid-open No. 59-130,314 and 59-100,710, tenacity of the PVA fibers has come to be enhanced by increasing the molecular weight to an extremely great extent (for instant, the average molecular weight: 400,000 or more). However, it is difficult to industrially produce PVA polymers having such a super high molecular weight. Further, their production cost greatly rises due to their difficult production as compared with fibers of such as polyester or nylon used for general tire-reinforcing cords. Thus, the PVA polymers have not acquired commercially competitive force.

Under these circumstances, a method has been discovered, which allows industrially relatively easy supply of high tenacity PVA fibers in a large scale by increasing the molecular weight of PVA polymers to an extent slightly greater than that of the conventional PVA fibers (e.g., Japanese patent application Laid-open Nos. 60-126,311 and 60-126,312). Thus, there comes a fair prospect that the PVA fibers are industrially and commercially used for tire cords. Although the high tenacity PVA fibers thus supplied have inferior tenacity and modulus as compared with aramid fibers, strength of the former is improved far more greatly than conventional fibers such as of nylon, polyester, etc. Thus, such PVA fibers have first been thought to be sufficiently used as tire cords. As described in Japanese patent application Laid-open No 61-108,713, the high tenacity PVA fibers obtained by the above method have greatly improved resistance against applications of mechanical strains as compared with the conventional ones. Therefore, thus improved PVA fibers have been thought to possess practically sufficient fatigue resistance as tire cords.

However, the present inventors have found that the high tenacity PVA fibers obtained by the above method have serious defect in fatigue resistance. That is, the PVA fibers lack fatigue resistance as tire cords as they are, and their cords are cut during running on general roads (hereinafter referred to as "CBU": cord breaking-up). Thus, the PVA fibers are not at all suitable for practical application from the standpoint of tire safety. This will be explained in more detail.

Passenger car tires having a tire size of 195/70 SR 14 were prepared by using fiber materials shown in the following Table 1 under conditions shown therein as cords for a carcass ply. With respect to those tires, a strength-retaining percentage of the cords of the carcass ply was evaluated after running on drum or after running on road in comparison with strength of fresh cords. Results obtained are also shown in Table 1. The strength-retaining percentage of the cords in the carcass ply was measured at a location of the tire marked by "x" in FIG. 1.

TABLE 1

|  | Cord construction | Cord twisting condtruction (turns/10 cm) | Strength-retaining percentage after 20,000 km running on drum | Strength-retaining percentage after 50,000 km running on road |
|---|---|---|---|---|
| Conventional PVA fibers | 1800 d/2 | 36 × 36 | CBU at 4,700 km | — |
| High tenacity PVA fibers (e.g. Japanese patent application laid-open No. 61-108,713) | 1500 d/2 | 39 × 39 | 60% | 20~40% |
| Polyester fibers | 1500 d/2 | 40 × 40 | 60% | not less than 90% |

As is clear from Table 1, the cord strength-retaining percentage of the high tenacity PVA fibers after running on drum is equivalent to that of the polyester fibers. On the other hand, the cord strength-retaining percentage of the polyester fibers after running on road was not less than 90%, whereas that of the high tenacity PVA fibers was lowered to 20 to 40%. In addition, some tires developed CBU, and were just ready to be punctured.

The above road running was carried out while a test tire was mounted on an ordinary vehicle and inflated at a normal internal pressure (ordinarily 1.7 kg/cm$^2$). This running conditions were in a controlled state as tire use conditions. In ordinary use conditions, there is the possibility that tires may be used in an abnormal state, e.g. sometimes overloaded or sometimes run at an internal pressure of not more than 1.0 kg/cm$^2$. Therefore, that the cord strength-retaining percentage after running 50,000 km on roads in the controlled state was 20 to 40% means that it must be judged that tires do not guarantee at all safety under ordinary use conditions. Thus, it was judged that such tires could not be practically used at all.

As mentioned above, since it was considered that phenomena peculiar to the PVA fibers could not be detected by the tire drum running test or a laboratory running test a so-called tube fatigue test, the present inventors further conducted the following tests to thoroughly investigate causes for the above fatigue. First, folded belt structure passenger car tires having a tire size of P235/75R15 were prepared by using different fiber materials shown in Table 2, respectively, as belt cords under conditions also shown therein. With respect to those tires, strength-retaining percentage of the belt cords after running on roads was evaluated in the manner as mentioned above. Results obtained are also shown in Table 2. The strength-retaining percentage of the belt cord was measured at a location marked by "x" in FIG. 2.

TABLE 2

| | Cord construction | Cord twisting construction (turns/10 cm) | Strength-retaining percentage after 32,000 km running on road |
|---|---|---|---|
| Aramid fiber | 1500 d/2 | 32 × 32 | 95~100% |
| High tenacity PVA fibers (e.g. Japanese patent application laid-open No. 61-108,713) | 1500 d/2 | 31 × 31 | 60~70% |

As is clear from the above Table 2, even when the high tenacity PVA fibers were used as the belt cords, the cord strength-retaining percentage was lowered to about 60% of that of the fresh cord. Thus, it was revealed that such high tenacity PVA fibers posed a great problem in fatigue resistance.

SUMMARY OF THE INVENTION

It is an object of the present invention to establish high tenacity PVA fibers of which cord strength does not almost decrease after running on roads, and improve durability of pneumatic tires by using such high tenacity PVA fibers for tire-reinforcing cords.

According to the present invention, there is a provision of a pneumatic tire reinforced with cords made of polyvinyl alcohol based fibers, wherein a tenacity, S (g/d) of said cords taken out from the tire meets a relation: $S \geq 14.5 - 12N_T$ in which $N_T$ is a coefficient of twist, represented by $N_T = N \times \sqrt{0.139 \times D/p} \times 10^{-3}$, N, D and p being a number of twist (turns/10 cm), a half of a total denier of the cords, and a specific density of the cords, respectively; and a strength-retaining percentage of the cord in an absolutely dried states not less than 90% of that before the treatment with boiling water, said absolutely dried state meaning that after the cord is treated with boiling water at 120° C. while being maintained at a constant length, the cord is dried.

These and other objects, features and advantages of the invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
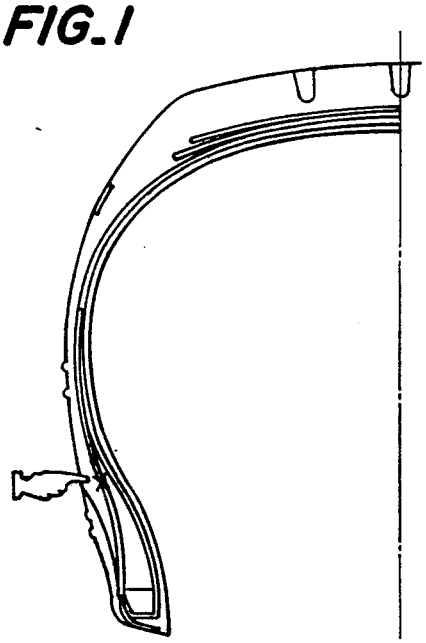
FIG. 1 is a partially sectional view of a passenger car tire having a tire size of 195/70 SR 14.

The present inventors had strenuously investigated causes for the above-mentioned decrease in tenacity of high tenacity PVA fiber cords after running on roads, and acquired the following knowledge. After cords were taken out from a tire having run on roads, buried in an epoxy resin, and cut by a microtome, a cord cross section was observed. This revealed that filaments near an intersecting surface between a ply twist and a primary twist were greatly deformed, and that 10 or more of the filaments cohered in the form of a bundle. In general, since the filaments play a role to disperse strain applied to a cord over every filament, reduction in strength of the filaments or the cord is promoted when the filaments cohere together and thus cannot uniformly disperse the strain.

In order to make clearer the above-mentioned cohesion phenomenon of the filaments, the ply twist and the cable twist were untwisted, and a cord interface at which the ply twist and the cable twist contacted each other was observed by a microscope. This revealed that every several to tens of the filaments were pressed in a filmy fashion as a unit and that it was impossible to mitigate applied strain, which has been considered to be done by the filaments themselve. Such a cohesion phenomenon of the filaments was not observed in the case of polyester fibers or aramid fibers, and was a phenomenon peculiarly observed in the PVA fibers only.

On the other hand, although the above filament cohesion phenomenon was slightly observed in a part of the cords having been subjected to a running test on a drum (20,000 km running, cord strength-retaining percentage: 60%), its degree was extremely small. Accordingly, it is considered that stress was still uniformly dispersed upon the filaments in the drum running test. As to the conventional PVA fibers, CBU occurred even at 4,700 km running on the drum, while the residual strength of the above high tenacity PVA fibers was 60% even after 20,000 km running. Thus, it is seen that the fatigue resistance of the latter was greatly improved as compared with that of the conventional PVA fibers. However, the phenomenon that the strength of the cords of even the thus improved high tenacity PVA fibers greatly decreased after the running on roads is a phenomenon beyond expectation from the conventional knowledge.

Under the circumstances, the present inventors have closely observed the cords and the filaments after the running on roads and after the running on drum, and found out differences mentioned below. That is, (1) Since the tires are repeatedly run and stopped in the case of running on roads, they are repeatedly subjected to irregular temperature hysteresis in a temperature range from room temperature to 100° C. (2) Applied stress received by the cords perpetually irregularily varies during running on roads, and accordingly locations where filaments rub one another vary and applied rubbing forces also vary. (3) To the contrary, the cords are placed at high temperatures not lower than 100° C. in case of the running on drum, so that the filaments themselves soften and tend to mitigate rubbing forces among them.

The above knowledgement can be explained by the following fact:

The filaments of the cords after the drum running had a so-called bias cut surface due to concentration of rubbing among the filaments upon one location in the filaments. To the contrary, scratches due to rubbing among the filaments were observed in a number of locations of the filament surfaces of the cords having undergone the road running. Scratches were observed at several locations of the bias cut surface.

In order to improve fatigue resistance of cords made of high tenacity PVA fibers by decreasing input applied when the filaments cohere together in the form of a bundle, the cohesion of the filaments has only to be prevented. The present invention has been made on the above knowledgement in consideration of the following.

That is, since the PVA fibers inherently contain intramolecular hydrogen bonds, it is considered that the hydrogen bonds exhibit affinity to water molecules even in the presence of a slight amount of water, which leads to ready cohesion of the PVA fibers themselves. It is also considered that water molecules enter non-crystalline portions of the PVA fibers, and invoke swelling of the PVA fiber non-crystalline portions, which causes reduction in the glass transition point.

In the case of the above high tenacity PVA fibers, high tenacity can be attained, for example, by densifying the non-crystalline portions or realizing high orientation. Japanese patent application Laid-open No. 61-108,713 reports that steam resistance of such high tenacity PVA fibers can be improved. However, as is clear from the above-mentioned results, it is impossible to enhance fatigue resistance of cords in running on roads by such improvements only.

Under these circumstances, the present inventors considered that if the non-crystalline portions are further densified or a so-called skin-core structure is formed, cohesion among the filaments due to water and heat can be prevented so that reduction in strength of the high tenacity PVA fiber cords during running on roads can substantially be prevented, and accomplished the present invention through further strenuous investigations.

That is, the present invention relates to a PVA fiber cord-reinforced pneumatic tire, in which tenacity (g/d) S of PVA fiber cords taken out from the tire meets the following relation:

$$S \geq 14.5 - 12 \, N_T$$

in which $N_T$ is a coefficient of twist, represented by $N_T = N \times \sqrt{0.139 \times D/p} \times 10^{-3}$, N, D and p being the number of twists of cords (turns/10 cm), $\frac{1}{2}$ of the total denier of the cords, and the specific density of the cords, respectively; and a strength-retaining percentage of the cords in an absolute dry state that after the cords are treated with boiling water at 120° C. while being maintained at a constant length, the cords are dried is not less than 90% of that before the boiling water treatment.

The treatment while the cords are maintained at the constant length specifically means that the cord taken out from the tire is wound around a hank reel under tension of 0.10 g/d, and is treated in water and in boiling water by raising the temperature from room temperature to 120° C. at a heating rate of 4° C./min in an autoclave while the length is maintained constant under the same tension.

The absolute dry state means a state in which the above-treated cord is dried in air up to a water content of about 2.5% in a desiccator at room temperature for 48 hours, and further dried in an oven at 120° C. for 20 minutes to give a constant weight.

The present inventors have first found out that if the residual strength of the cords having undergone the boiling water treatment and the succeeding drying is not less than 90% of that of the cords before the boiling water treatment, reduction in the strength of the cords after running on roads is suppressed within 20% and thus the cords are improved to a level which poses no problem in safety during running on roads. It is considered that boiling water resistance is improved in such a manner by increasing densification of the non-crystalline portions and converting the structure to a skin-core type.

Next, high tenacity vinylon as required in the present invention can generally be produced by using a polymer in which the molecular weight is greatly increased as compared with those for the production of conventional vinylon and increasing the drawing percentage during spinning, or by a generally so-called gel spinning process in which a polymer having super high molecular weight is spun from a diluted solution and drawn at a high percentage. At that time, wet thermal degradation resistance, etc. of vinylon can be improved by chemically modifying it through thermally treating the drawn fibers or by thermally converting them into the form of an acetal, a formal or the like.

Japanese patent application Laid-open Nos. 61-108,71, 61-108,712 and 61-108,713 report that a solution of a PVA based polymer having a polymerization degree of not less than 1,500 is discharged through numerous holes of a perforated nozzle, a gelled filaments are drawn in a desolvating conditions at a draft of not less than 13 times, and the content of shidiotact is not less than 52%. However, strength of cords after tire running on roads cannot be prevented by such a method from greatly lowering. Thus, a PVA based polymer solution is first discharged through the holes of a perforated nozzle, and gelled in a cooling bath containing a liquid which exhibits non-affinity to a solvent in the polymer solution and which is held at temperatures high enough to gel the polymer. Then, the gelled filaments are subjected to desolvation. At that time, it is necessary to suppress desolvation to an extremely low speed. For instance, the desolvation needs to be effected slowly by using a solidifying bath containing a mixture of methanol, ethanol, or acetone and DMSO as a solidifying bath or by thermally drawing the gelled filaments and gradually lowering the concentration of DMSO as a solvent of the PVA based polymer in the solidifying bath through mixing water into DMSO. By effecting the desolvation in this manner, filaments can greatly be prevented from cohering together. Thus, high tenacity PVA fiber cords which pose completely no safety problems in running on roads can be offered.

In the pneumatic tires according to the present invention, the tenacity-retaining percentage of the high tenacity PVA fiber cords taken out from the tires after running on roads is not less than 80%. Further, the tenacity-retaining percentage is not less than 80% even in the case where the cords are used as a belt. Such high tenacity PVA fibers meeting the requirements in the present invention can greatly improve tenacity and modulus of elasticity as compared with conventional nylon and polyester fibers. As a result, a use amount of the cords can greatly be reduced as compared with the conventional fiber cords, which enables weight reduction and low rolling resistance of tires. Further, when such cords are used as a belt material instead of steel cords, road noises can be reduced and riding confortability can largely be improved.

Next, the present invention will be explained with reference to examples of the present invention and comparative examples.

First, production examples of polyvinyl alcohol based synthetic fibers will be explained.

Production 1

A dimethyl sulfoxide (DMSO) solution containing 12% by weight of a completely saponified type (saponification degree: 99.5% or more) polyvinyl alcohol having a polymerization degree of 4,500 was prepared. The solution was dry or wet spun into, as a spinning liquid, a first methyl alcohol based solidifying liquid containing 85% by weight of DMSO through a spinning nozzle, having 750 holes of 0.08 mm in diameter, arranged 5 cm above the liquid in a solidifying bath. Further, the spun filaments were passed through a solidifying liquid consisting of 60% by weight of DMSO and 40% by weight of methyl alcohol in a second solidifying bath, and a solidifying liquid consisting of 20% by weight of DMSO and 80% by weight of methyl alcohol in a third solidifying bath, followed by desolvation. Each of the solidifying baths was maintained at 5° C. The obtained solidified filaments (multifilament yarn) was washed in a methanol bath to remove DMSO, drawn at five times in the methanol bath, and dried while being separated with a turbulent gas stream. The dried and opened multifilament yarns were drawn at a drawing magnification of 4.7 times in a dry heating tube heated at 240° C., and rolled while oil being applied thereto. Thereby, substantially fusion-free tire cord yarns having an indication denier (D): 1500 D, the number of filaments of 750, a filament open degree of not less than 90%, tensile strength of 18.8 g/d, and initial modulus of elasticity of 420 g/d were obtained. The filament open degree means a percentage of filaments which are not fuse to one another.

Production No. 2

Tire cord filaments having physical properties of 18.9 g/d in tensile strength and 430 g/d in initial modulus of elasticity were obtained under the same conditions in production No. 1 except that the polymerization degree was 4,900, drawn magnification in methanol bath was 5.5 times, and drawing magnification in the dry heating tube was 4.3 times.

Production No. 3

A DMSO solution containing 15% by weight of completely saponified type (saponification degree: 99.5% or more) polyvinyl alcohol having a polymerization degree of 4,300 was prepared, and discharged and solidified in a solidifying bath of methanol containing 10% of DMSO as a spinning liquid through a spinning nozzle with 500 holes of 0.08 mm in diameter. The liquid temperature of the solidifying liquid was 30° C. After the thus obtained solidified yarns (multifilament yarns) were wet thermally drawn at 3.8 times, they were dried and then drawn in hot air stream at 240° C. at 5.8 times. Thereby, substantially fusion-free tire cord yarns having an indication denier (D) of 1,500 D, the number of filaments of 500, a filament open degree of not less than 90%, tensile strength of 18.4 g/d, and initial modulus of elasticity of 415 g/d were obtained.

Production No. 4

Tire cord yarns having physical properties of 18.5 g/d in tensile strength and 420 g/d in initial modulus of elasticity were obtained in the same manner as in Production No. 3 except that the polymerization degree was 4,600, and wet thermal drawing degree was 4.0 times.

Production No. 5

Tire cord yarns having physical properties of 18.2 g/d in tensile strength and 405 g/d in initial modulus of elasticity were obtained in the same manner as in Production No. 3 except that the polymerization degree was 4,600, and wet thermal drawing degree in hot air stream was 5.5 times.

EXAMPLES 1 AND 2 AND COMPARATIVE EXAMPLES 1 TO 4

As shown in the following Table 3, conventional PVA fibers and high tenacity PVA fibers obtained in the above production examples were twisted in the form of a cord and immersed into an RFL (resorcinol) adhesive given below, which were subjected to thermal treatment under tension through a drying zone, a hot zone, and a normalizing zone. Treating temperatures, times and tension conditions of those zones were: the drying zone— 150° C.×120 sec.×0.1 g/d; the hot zone—200° C.×40 sec. ×1 g/d; and the normalizing zone—200° C.×40 sec.× 0.5 g/d.

| RFL adhesive | |
|---|---|
| | (Parts by weight) |
| soft water | 597 |
| resorcinol | 18.20 |
| 37% formaldehyde aqueous solution | 26.90 |
| 10% caustic soda aqueous solution | 6.60 |
| vinylpyridine rubber latex (41%)* | 351.3 |

*Styrene-butadiene-vinylpyridine latex (rubber product JSR 0650 manufactured by Japan Synthetic Rubber Co., Ltd.)

The thus obtained cords were woven in the form of a tire fabric, which was covered with a rubber sheet to obtain a rubberized cloth according to the ordinary method. A passenger car radial tire having a tire size of 195/70 SR 14 was prepared under an ordinary vulcanizing conditions by using the rubberized cloth as a carcass ply in a cord construction shown in Table 3. Those tires were the same as that shown in FIG. 1, and had the greatest reduction percentage in strength of a bead turn-up portion marked by "x" in FIG. 1 in a BF drum running test and a road running test mentioned later. Thus, cords at portions "x" were subjected to the following tests.

The end count of the cords at a crow center portion of each of the test tires was set at 33 cords/5 cm.

(1) Measurement of cord tenacity (S)

After rubber attached to a cord taken out from a tire at a location to be measured was removed with scissors, the cord was pulled at room temperature at a chuck span of 10 cm according to JIS L 1017, and tenacity at break was measured. Tenacity S (g/d) was obtained by dividing the thus measured tenacity at break by the total denier before twisting. The denier number before the twisting was used as the total denier number to avoid complication, because the cord slightly expands or shrinks during cord treatment or tire vulcanization and some rubber attaches to the cord taken out from a tire.

(2) Measurement of cord tenacity-retaining percentage after treatment with boiling water at 120° C.

Figure 3:
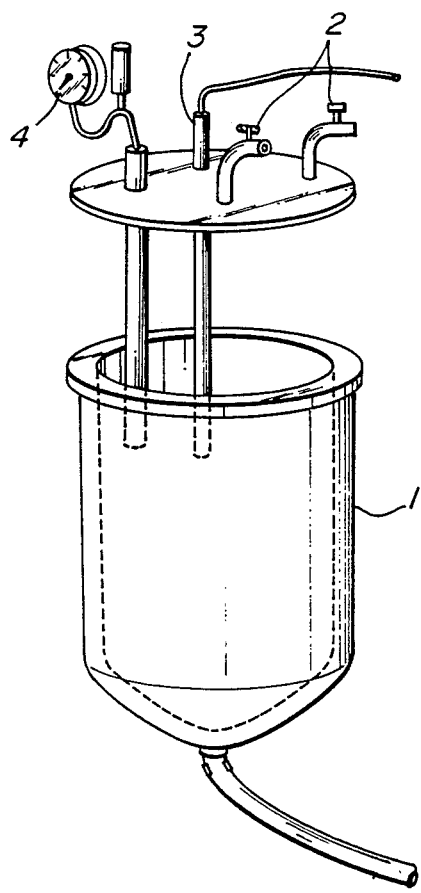
FIG. 3 is a perspective view of a high pressure glass container for treating tire cords with boiling water.

A cord was taken out from a fresh tire, and rolled by a 5 cm diameter reel under tension of 0.1 g/d after rubber attached to the cord was well removed with scissors. Next, while ends of the cord were fixed lest the rolled cord should slacken, the cord was immersed into distilled water fully filled in a high pressure glass container 1 equipped with a pressure gauge 4 as shown in FIG. 3. The distilled water was obtained by vaporizing water by boiling and cooling the obtained steam down to room temperature. Thereafter, the high pressure glass container 1 was sealed and then heated at a heating rate of 4° C./min, while being observed with a thermometer 3. When the container reached 120° C. in about 30 minutes, valves 2 were opened to return the container to atmospheric pressure. Then, a cord was taken out, and dried in air for 48 hours and dried in an oven at 120° C. for 20 minutes. Subsequently, the cord was cooled down to room temperature in a desiccator for about 1 hour, and strength and elongation of the cord were immediately measured.

TEM-U (1,000 type) manufactured by TAIATSU GLASS KOGYO CO., LTD. was used as the above high pressure glass container. Measurement was carried out according to JIS L 1017 under a cord-pulling condition that a chuck span was 10 cm.

(3) BF drum runninq test

After a test tire was inflated at an internal pressure of 3.0 kg/cm² in a room of 25° C. ± 2° C., the tire was allowed to be left for 24 hours. Then, after the air pressure was adjusted again, the tire was run on a drum of about 3 m in diameter at a speed of 60 km/h over 20,000 km, while a load two times that in JIS was applied to the tire. Then, a cord was taken out from the tire, and the cord strength was measured as above according to JIS L 1017.

(4) Road running test

A test tire was mounted on a general passenger car after being assembled onto a normal rim, and run on general roads. Cord tenacity was measured as above after a tire having a tire size of 195/70 SR 14 and a tire having a tire size of P235/75R15 were subjected to running on roads about 50,000 km and about 32,000 km, respectively.

When tires having tire sizes of 195/70 SR 14 and P235/75R15 were run on roads at tire internal pressures of 1.7 kg/cm² and 2.1 kg/cm², respectively, the tires were almost completely worn.

Results obtained are shown in Table 3.

Comparative Example 1 used the conventional PVA fibers for the cords of the carcass ply. Since the cords at a turn-up portion of a bead of this tire were cut in the BF drum running test at a distance of 4,700 km, and the test was stopped due to CBU trouble. Thus, no road running test was carried out. The cord strength-retaining percentage after the treatment with boiling water at 120° C. was reduced to less than a half of the original value, i.e., 41%.

Comparative Examples 2 to 4 and Examples 1 and 2 used the high tenacity PVA fibers for cords of a monoply carcass cords. It is seen that the reduction rates of the cord strength-retaining percentage after the BF drum running test and that after the running on roads decreased as the cord strength-retaining percentage after treatment with boiling water at 120° C. increased.

EXAMPLES 3 AND 4 AND COMPARATIVE EXAMPLES 5 TO 8

Figure 2:
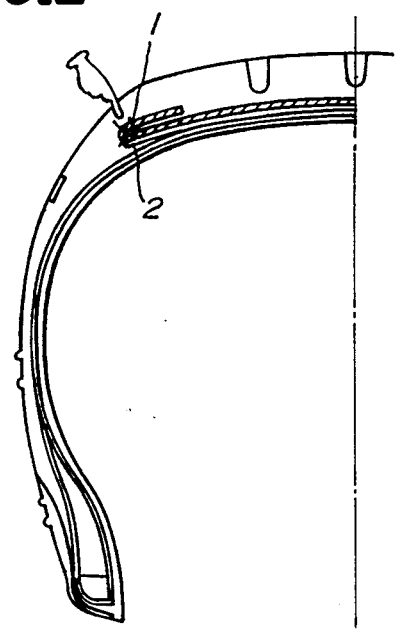
FIG. 2 is a partially sectional view of a passenger tire having P235/75R15.

As shown in Table 4, each of conventional PVA fibers and the high tenacity PVA fibers obtained in the above production examples were twisted as a cord, and subjected to the adhesive-applying treatment and the thermal treatment under tension as in "Examples 1 and 2 and Comparative Examples 1 to 4". The thus treated cords were woven in the form of a tire fabric, which was covered with a rubber sheet to obtain a rubberized cloth according to an ordinary method. A passenger car radial tire having a tire size of P 235/5 R 15 under the ordinary vulcanizing conditions by using the rubberized cloth as a belt ply as a second belt having a folded structure in a cord construction shown in Table 4. Those tires were the same as that shown in FIG. 2. With respect to the tires prepared, a portion of a turn-up end portion marked by "x" was subjected to the above tests. Results obtained are shown in Table 4.

The end count of the cords at this portion was 40 cords/5 cm in all the tires.

TABLE 3

|  | Comparative Example 1 | Comparative Example 2 | Comparative Example 3 | Comparative Example 4 | Example 1 | Example 2 |
|---|---|---|---|---|---|---|
| Material of carcass ply cords | Conventional PVA | high tenacity PVA (Production No. 3) | high tenacity PVA (Production No. 4) | high tenacity PVA (Production No. 5) | high tenacity PVA (Production No. 1) | high tenacity PVA (Production No. 2) |
| Cord construction (denier) | 1800 d/2 | 1500 d/2 | 1500 d/2 | 1500 d/2 | 1500 d/2 | 1500 d/2 |
| Number of twist (ply twist × cable twist turns/10 cm) | 36 × 36 | 39 × 39 | 39 × 39 | 39 × 39 | 39 × 39 | 39 × 39 |
| Coefficient of twist ($N_T$) | 0.456 | 0.493 | 0.493 | 0.493 | 0.493 | 0.493 |
| Strength of fresh cords (kg/cord) | 28.7 | 32.7 | 32.6 | 32.8 | 33.0 | 32.9 |
| Tenacity of fresh cord (g/d) | 8.0 | 10.9 | 10.9 | 10.9 | 11.0 | 11.0 |
| Running distance on BF drum | CBU at 4,700 km | completed 20,000 km running | completed 20,000 km running | completed 20,000 km running | completed 20,000 km running | completed 20,000 km running |
| Cord strength-retaining percentage after running on BF drum (%) | 0 | 60 | 60 | 65 | 70 | 72 |
| Cord strength-maintaining percentage after 50,000 km running on road (%) | (not run on road) | 20~40 | 60~75 | 65~80 | 85~90 | 98~100 |
| Cord strength-maintaining percentage after treatment with boiling water at 120° C. | 45 | 63 | 80 | 85 | 92 | 95 |

The following were confirmed from the test results shown in Table 3.

TABLE 4

|  | Comparative Example 5 | Comparative Example 6 | Comparative Example 7 | Comparative Example 8 | Example 3 | Example 4 |
|---|---|---|---|---|---|---|
| Material of belt cords | Conventional PVA | high tenacity PVA (Production No. 3) | high tenacity PVA (Production No. 4) | high tenacity PVA (Production No. 5) | high tenacity PVA (Production No. 1) | high tenacity PVA (Production No. 2) |
| Cord construction (denier) | 1800 d/2 | 1500 d/2 | 1500 d/2 | 1500 d/2 | 1500 d/2 | 1500 d/2 |
| Number of twist (ply twist × cable twist turns/10 cm) | 28 × 28 | 31 × 31 | 31 × 31 | 31 × 31 | 31 × 31 | 31 × 31 |
| Coefficient of twist ($N_T$) | 0.388 | 0.393 | 0.393 | 0.393 | 0.393 | 0.393 |
| Strength of fresh cords (kg/cord) | 31.0 | 36.8 | 36.6 | 37.0 | 36.9 | 37.0 |
| Tenacity of fresh cord (g/d) | 8.6 | 12.3 | 12.2 | 12.3 | 12.3 | 12.3 |
| Cord strength-retaining percentage after 32,000 km running on road (%) | 20~30 | 40~52 | 60~70 | 75~83 | 81~90 | 89~96 |
| Cord strength-retaining percentage after treatment with boiling water at 120° C.(%) | 41 | 59 | 76 | 83 | 90 | 93 |

The following are confirmed from the test results in Table 4.

Comparative Example 5 used the conventional PVA fibers for the belt cords. Since the strength-retaining percentage after the treatment with boiling water at 120° C. was as low as 41%, that of the cord after the running on roads was 20 to 30%, and thus the cords were almost in a broken state.

In Comparative Examples 6 to 8 and Examples 3 and 4, extremely excellent correlation between the cord strength-retaining percentage after the treatment with boiling water at 120° C. and that after the running on roads was obtained. Particularly, in Examples 3 and 4, since the cord tenacity-retaining percentage after the treatment with boiling water at 120° C. was not less than 90%, the cord tenacity-retaining percentage after the running on roads was ensured to be not less than 80%. Thus, no problem occurred with respect to safety.

As described above, according to the pneumatic tires reinforced with the high tenacity PVA fiber cords in the present invention, reduction in tenacity of the cords even after the running on roads can be suppressed. Consequently, durability of the tire can greatly be improved.

What is claimed is:

1. A pneumatic tire reinforced with cords made of polyvinyl alcohol based fibers, wherein a tenacity, S (g/d) of said cords taken out from the tire meets the relationship: $S \geq 14.5 - 12N_T$ in which $N_T$ is a coefficient of twist, represented by $N_T = N \times \sqrt{0.139 \times D/p} \times 10^{-3}$, wherein N, D and p represent a number of twists (turns/10 cm), a half of a total denier of the cords, and a specific density of the cords, respectively; and wherein a tenacity-retaining percentage of the cord in an absolutely dried state is not less than 90% of that before a treatment with boiling water, said absolutely dried state means that after the cord is treated with boiling water at 120° C. while being maintained at a constant length, the cord is dried.

* * * * *